US009506282B2

(12) United States Patent
Linkner (10) Patent No.: US 9,506,282 B2
(45) Date of Patent: Nov. 29, 2016

(54) TUMBLE-HOME EXTENDING SLIDING DOOR SYSTEM (71) Applicant: Robbie M Linkner, Ann Arbor, MI (US)

(72) Inventor: Robbie M Linkner, Ann Arbor, MI (US)

(73) Assignee: FCA US LLC, Auburn Hills, MI (US)

( * ) Notice: Subject to any disclaimer, the term of this patent is extended or adjusted under 35 U.S.C. 154(b) by 20 days.

(21) Appl. No.: 13/869,370

(22) Filed: Apr. 24, 2013

(65) Prior Publication Data

US 2014/0318017 A1 Oct. 30, 2014

(51) Int. Cl.
| *E05D 15/10* | (2006.01) |
| *E05D 15/06* | (2006.01) |
| *B60J 5/04* | (2006.01) |
| *E06B 3/50* | (2006.01) |
| *B60J 5/06* | (2006.01) |

(52) U.S. Cl.
CPC ............ *E05D 15/0608* (2013.01); *B60J 5/047* (2013.01); *B60J 5/06* (2013.01); *E05D 15/101* (2013.01); *E05D 15/1047* (2013.01); *E06B 3/50* (2013.01); *E05Y 2201/624* (2013.01); *E05Y 2800/122* (2013.01)

(58) Field of Classification Search
CPC ............ E05D 15/0608; E05D 15/101; E05D 15/1047; B60J 5/06; B60J 5/047; E06B 3/50
USPC ............................. 49/360, 209, 213; 296/155
See application file for complete search history.

(56) References Cited

U.S. PATENT DOCUMENTS

| 3,384,995 | A | * | 5/1968 | Furrer ............................ 49/213 |
| 4,688,352 | A | * | 8/1987 | Kinoshita ....................... 49/209 |
| 5,896,704 | A | | 4/1999 | Neag et al. |
| 5,992,097 | A | * | 11/1999 | Makiuchi et al. ............. 49/216 |
| 6,036,257 | A | * | 3/2000 | Manuel ......................... 296/155 |
| 6,286,261 | B1 | | 9/2001 | Hackstock |
| 6,328,374 | B1 | * | 12/2001 | Patel ............................. 296/155 |
| 6,682,353 | B2 | * | 1/2004 | Bigotto ........................... 439/34 |
| 6,840,567 | B2 | | 1/2005 | Fushimi et al. |
| 6,932,417 | B2 | | 8/2005 | Barczynski et al. |
| 7,243,978 | B2 | | 7/2007 | Mather et al. |
| 7,658,438 | B1 | * | 2/2010 | Elliott et al. .................. 296/155 |
| 8,713,852 | B2 | * | 5/2014 | Choi .............................. 49/360 |
| 2008/0129085 | A1 | * | 6/2008 | Kim et al. ..................... 296/155 |
| 2010/0045068 | A1 | | 2/2010 | Gaudig |
| 2012/0036781 | A1 | * | 2/2012 | Runk et al. ..................... 49/181 |

FOREIGN PATENT DOCUMENTS

DE   10326241 A1   1/2005

OTHER PUBLICATIONS

International Search Report and Written Opinion dated Oct. 15, 2014 for International Application No. PCT/US2014/034629, International Filing date Apr. 18, 2014.

* cited by examiner

*Primary Examiner* — Gregory Strimbu
(74) *Attorney, Agent, or Firm* — Ralph E. Smith (57) ABSTRACT

A support arm for a sliding door of a mobile platform may include a first housing slidably attached to the mobile platform proximate to an opening of the mobile platform and a second housing attached to the sliding door of the mobile platform and to the first housing. The second housing may be moveable relative to the first housing between a retracted state and an extended state.

6 Claims, 6 Drawing Sheets

TUMBLE-HOME EXTENDING SLIDING DOOR SYSTEM

FIELD

The present disclosure relates to a closure panel for a mobile platform and more particularly to a sliding-door system for a vehicle.

BACKGROUND

Vehicles such as vans, minivans, and sport-utility vehicles are increasingly incorporating sliding-door systems to provide easy and quick access to an interior compartment of the vehicle. Such sliding-door systems are gaining popularity, as such systems allow a body-side opening of the vehicle to be completely open while concurrently maintaining a door panel of the sliding-door system in close proximity to a body-side aperture of the vehicle. Maintaining the door in close proximity to the body-side aperture such that the door is substantially parallel to the body-side aperture when the door is in an open state allows the door to be moved from a closed state to the open state without requiring a large space between the vehicle and an adjacent vehicle or a garage wall, for example.

While conventional sliding-door systems adequately provide quick and easy access to an interior compartment of a vehicle and, further, are maintained in close proximity to a body-side panel, conventional sliding-door systems require the vehicle in which the system is installed to include a substantially flat body-side profile to permit the sliding-door system to function properly. Namely, conventional sliding-door systems can only be installed on vehicles having a relatively small degree of body-side curvature to allow the sliding-door system to concurrently accommodate three separate track mechanisms and to permit the door to be placed adjacent and substantially parallel to the side panel of the vehicle when the door is in the open state.

Providing a vehicle with a reduced or relatively small degree of body-side curvature, however, negatively impacts and limits the styling and overall appearance of the vehicle. In short, the added functionality provided by implementing conventional sliding-door systems often comes at the expense of the styling and overall appearance of the vehicle.

SUMMARY

A support arm for a sliding door of a mobile platform is provided and may include a first housing slidably attached to the mobile platform proximate to an opening of the mobile platform and a second housing attached to a door of the mobile platform and to the first housing. The second housing may be moveable relative to the first housing between a retracted state and an extended state.

In another configuration, a sliding-door assembly for a mobile platform is provided and may include a door movable relative to the mobile platform between a closed state and an open state. The sliding-door assembly may additionally include a support arm slidably supporting the door relative to the mobile platform and having a first housing slidably attached to the mobile platform. A second housing may be operatively attached to the first housing at a first end and may be operatively attached to the door at a second end. The second housing may be movable between a retracted state decreasing an effective length of the support arm and an extended state increasing the effective length of the support arm.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

With reference to the figures, a mobile platform 10 incorporating a sliding-door system 12 in accordance with the principles of the present disclosure is provided. The sliding-door system 12 may include a closure panel or door 14 that is movable between a closed state (FIGS. 1 and 2) and an open state (FIG. 5) to selectively provide access to an interior compartment 16 of the mobile platform 10 via a body-side opening 18. While the sliding-door system 12 may be used in conjunction with any mobile platform, the sliding-door system 12 will be described and shown hereinafter as being associated with a vehicle.

The sliding-door system 12 may include an upper track 20, a lower track 22, and a middle track 24 that cooperate to slidably support the door 14 relative to a rear-body panel 26 (FIG. 1) of the vehicle 10. The upper track 20 may be fixably attached to the vehicle 10 proximate to a roof panel 28 of the vehicle 10 and may include a curved portion 30 that extends in a direction away from an outer surface 34 of the vehicle 10 (FIG. 1) and into the interior compartment 16 and a straight portion 32 that may be substantially parallel to a longitudinal axis of the vehicle 10. The upper track 20 may be fixably attached to the vehicle 10 proximate to the roof panel 28 via a series of welds and/or structural adhesive to fix the upper track 24 for movement with the vehicle 10.

The upper track 20 may receive a portion of an upper roller assembly 36 having a first end rotatably attached to the upper track 20 and a second end attached to the door 14. Specifically, the upper roller assembly 36 may include at least one roller 38 that is received within the upper track 20 and is permitted to move within and relative to the upper track 20. While the roller 38 is received within the upper track 20 and is permitted to rotate relative to and within the upper track 20, the roller 38 is constrained by the upper track 20 such that the roller 38 is not removable from the upper track 20 during use of the sliding-door system 12.

Figure 3:
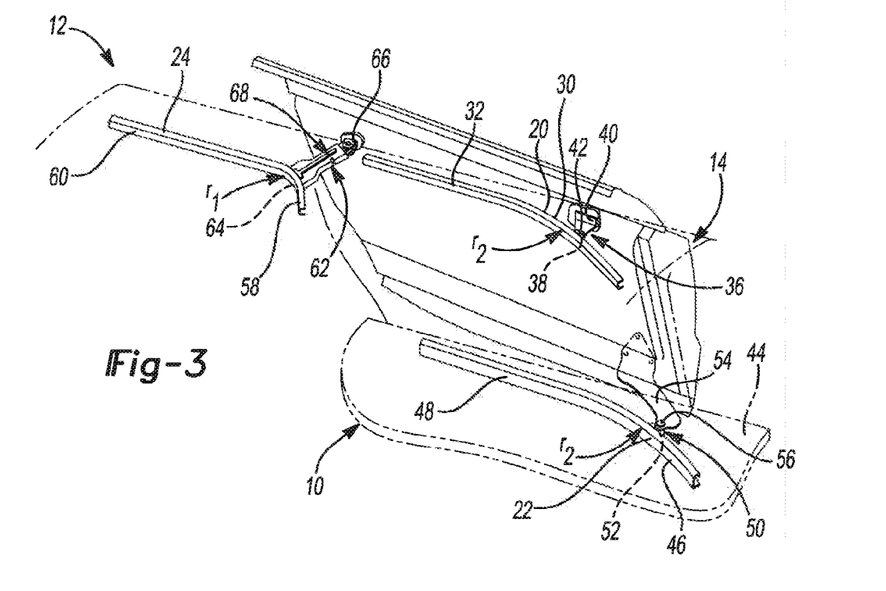
FIG. 3 is a partial perspective view of the vehicle of FIG. 1 showing the sliding-door assembly in a partially open state.
Figure 4:
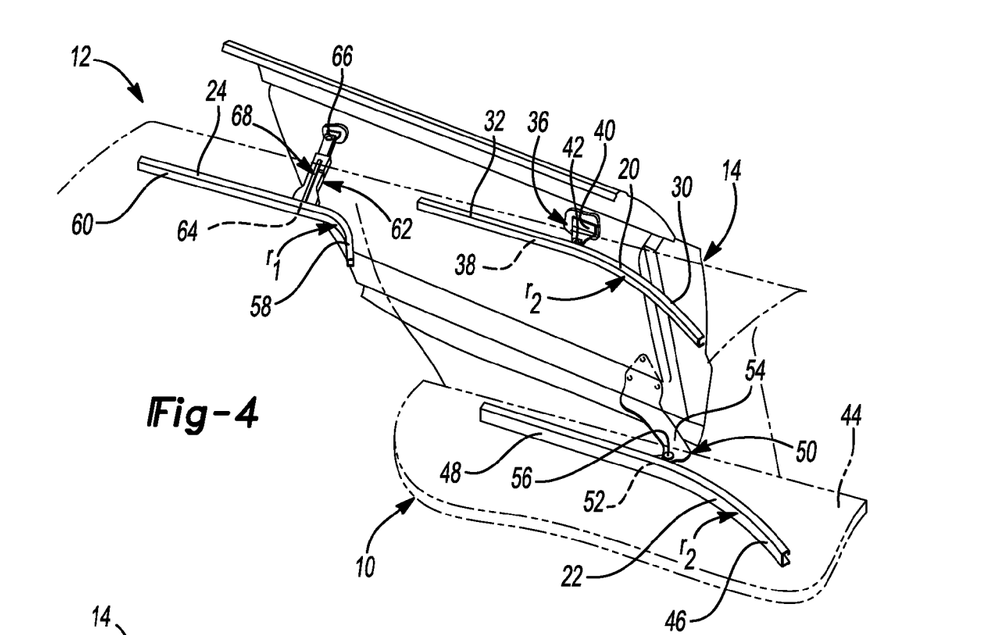
FIG. 4 is a partial perspective view of the vehicle of FIG. 1 showing the sliding-door assembly in a partially open state.

The upper roller assembly 36 may additionally include a bracket 40 that is attached to the door 14. The bracket 40 may be attached to the roller 38 by a link or arm 42 that extends generally between the roller 38 and the bracket 40. The arm 42 may be pivotably attached to the bracket 40 to allow the arm 42 to rotate relative to the bracket 40 as the door 14 is moved from the closed state (FIG. 2) to the open state (FIG. 4). Allowing the bracket 40 to move relative to the roller 38 allows the door 14 to move from the closed state (FIG. 2) to the partially open state (FIGS. 3 and 4), and finally to the fully open state (FIG. 5) without binding the door 14. Further, interaction between the upper roller assembly 36 and the upper track 20 guides movement of the door 14 when the door 14 is moved between the closed state and the open state. Accordingly, interaction between the roller assembly 36 and the upper track 20 guides movement of the door 14 between the closed state and the open state such that a top portion of the door 14 moves in a direction defined substantially by the shape of the curved portion 30 and the straight portion 32 of the upper track 20 when the door 14 is moved between the closed state and the open state.

The lower track 22 may be attached to the vehicle 10 proximate to a lower sill 44 of the vehicle 10 and may include a curved portion 46. As with the upper track 20, the curved portion 46 of the lower track 22 may extend in a direction away from the outer surface 34 of the vehicle 10 such that the curved portion 46 extends into the interior compartment 16. The straight portion 48 may be substantially parallel to a longitudinal axis of the vehicle to allow the door 14 to move along a linear path, as the door 14 is moved between the closed state and the open state. While the straight portion 32 of the upper track 20 and the straight portion 48 of the lower track 22 are described as being substantially parallel to a longitudinal axis of the vehicle, each of the straight portions 32, 48 may be positioned at an angle relative to the longitudinal axis. Regardless of the relative position of the straight portions 32, 48 relative to the longitudinal axis of the vehicle, the straight portion 32, may be substantially parallel to the straight portion 48 to allow the door 14 to freely slide between the closed state and the open state when the door 14 is moving relative to the rear-body panel 26 within the straight portions 32, 48.

The door 14 may be movably attached to the lower track 22 via a lower roller assembly 50. The lower roller assembly 50 may include one or more rollers 52 that are received within the lower track 22. As with the rollers 38, the rollers 52 may be received within the lower track 22 and may be movable within and relative to the lower track 22 but are constrained within the lower track 22 such that the rollers 52 are restricted being removed from the lower track 22 during operation of the sliding-door system 12.

The lower roller assembly 50 may also include a bracket 54 that is attached to a bottom portion of the door 14 at a first end and is pivotably attached to the roller 52 at a second end. Specifically, the bracket 54 may be welded or otherwise fixably attached proximate to a bottom portion of the door 14 at a first end and may be rotatably attached to the roller 52 via a pivot 56 at a second end. As with the upper track 20 and the upper roller assembly 36, the lower track 22 and the lower roller assembly 50 may cooperate to guide movement of the door 14 between the closed state to the open state. Such movement of the door 14 is guided by the overall shape of the curved portion 46 and the straight portion 48 of the lower track 22 and is permitted by allowing the bracket 54 to rotate relative to the roller 52 about the pivot 56.

Figure 1:
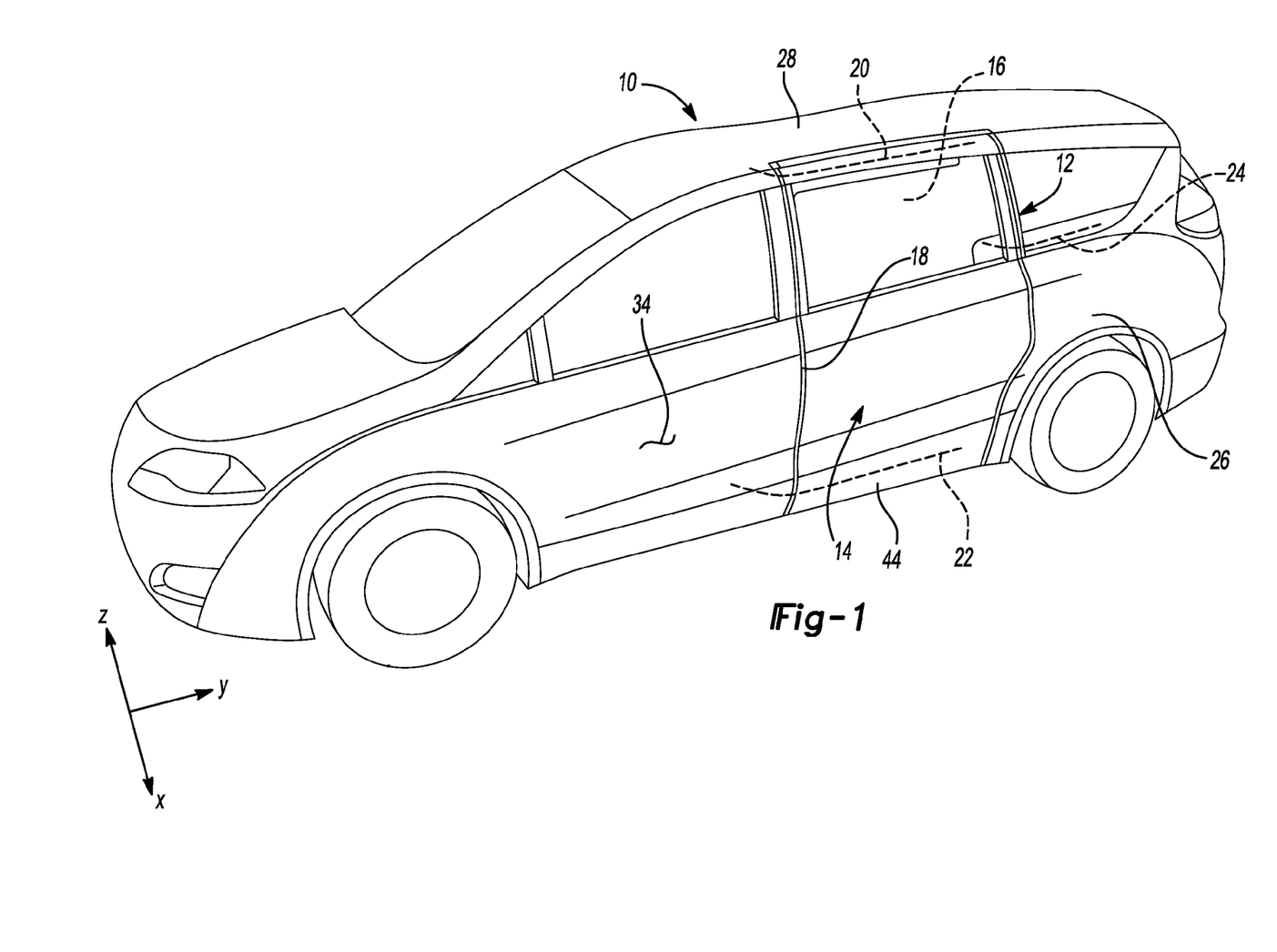
FIG. 1 is a partial perspective view of a vehicle incorporating a sliding-door assembly in accordance with the principles of the present disclosure.
Figure 6:
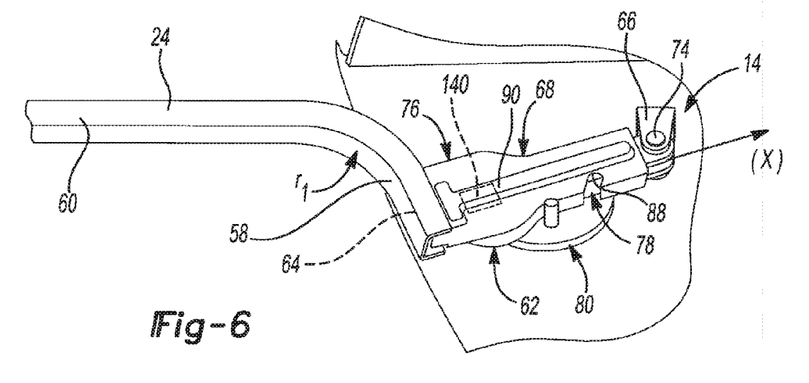
FIG. 6 is a partial perspective view of the sliding-door assembly of FIG. 1 showing a door of the sliding-door assembly in a closed state and a middle rail lever arm in a retracted state.

The middle track 24 is positioned generally between the upper track 20 and the lower track 22 along the (Z) axis but is positioned closer to a rear portion of the vehicle 10 along the (Y) axis (FIG. 1). The middle track 24 may be fixably attached to the vehicle 10 at the rear-body panel 26 and may be attached via a series of welds and/or structural adhesive. The middle track 24 may include a curved portion 58 that extends in a direction substantially away from outer surface 34 of the vehicle 10 and into the interior compartment 16 in a similar fashion as the upper track 20 and the lower track 22. While the curved portion 58 of the middle track 24 extends into the interior compartment 16 in a similar fashion as the curved portions 30, 46 of the upper track 20 and the lower track 22, respectively, the curved portion 58 of the middle track 24 may include a smaller radius of curvature ($r_1$; FIG. 6) then the radius of curvature ($r_2$) of the upper track 20 and lower track 22.

The middle track 24 may additionally include a straight portion 60 that extends from the curved portion 58 and is substantially parallel to a longitudinal axis of the vehicle 10. While the straight portion 60 may be substantially parallel to a longitudinal axis of the vehicle 10, the straight portion 60 could be formed at an angle relative to the longitudinal axis of the vehicle 10. Regardless of the position of the straight portion 60 of the middle track 24 relative to the longitudinal axis of the vehicle 10, the straight portion 60 may be substantially parallel to the straight portions 32, 48 of the upper track 20 and the lower track 22, respectively, to prevent binding of the door 14 as the door 14 moves between the closed state and the open state.

The door 14 may be movably attached to the middle track 24 by a middle roller assembly 62. The middle roller assembly 62 may include one or more rollers 64, a mounting bracket 66, and an arm 68 extending generally between the rollers 64 and a mounting bracket 66. As with the rollers 38, 52, respectively, associated with the upper track 20 and the lower track 22, the rollers 64 associated with the middle roller assembly 62 may permit movement of the mounting bracket 66 and, thus, the door 14 relative to and within the middle track 24 but restrict removal of the mounting bracket 66 from the middle track 24 during operation of the sliding-door system 12. Specifically, the rollers 64 may be positioned such that a pair of rollers 64 are positioned substantially 90 degrees (90°) relative to one or more rollers 64 to permit movement of the rollers 64 within the middle track 24 while concurrently restricting removal of the rollers 64 from the middle track 24.

Figure 10:
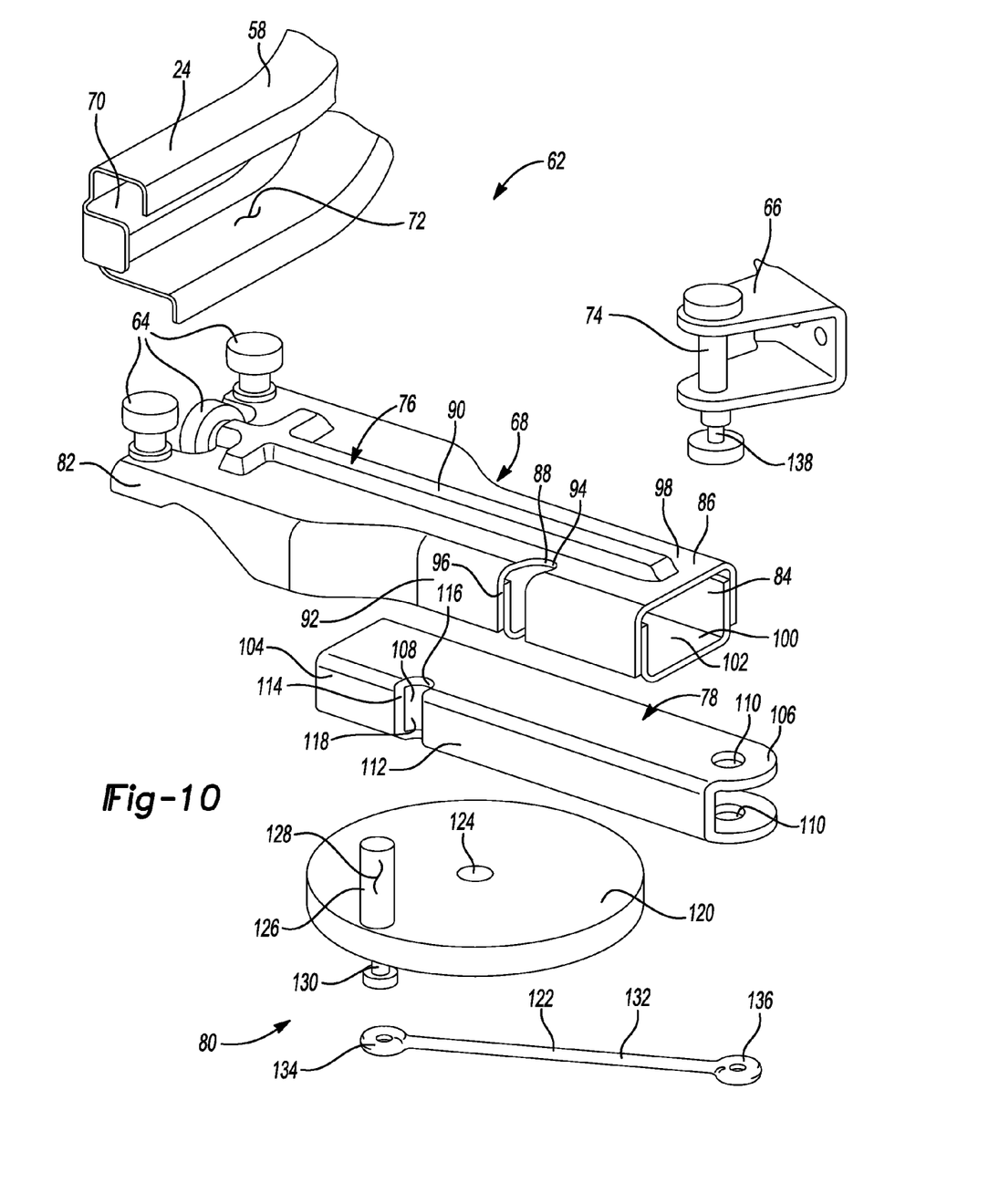
FIG. 10 is an exploded view of a middle rail lever arm of the sliding-door assembly of FIG. 1.

For example, the rollers 64 may be positioned within the middle track 24 such that a pair of rollers 64 are received within an upper channel 70 (FIG. 10) of the middle track 24 while a third roller 64 is positioned substantially ninety (90°)

degrees relative to the pair of rollers 64 that are received within the upper channel 70. The third roller 64 may engage a bottom surface 72 of the middle track 24 when the rollers 64 are moved relative to and within the middle track 24.

The mounting bracket 66 may be fixably attached to the door 14 via a fastener and/or weld and may be pivotably attached to the arm 68. Specifically, the mounting bracket 66 may receive a pivot 74 that rotatably couples the mounting bracket 66 to the arm 68 (FIGS. 6-9). Cooperation between the mounting bracket 66, the arm 68, and the pivot 74 allows relative movement between the mounting bracket 66 and the arm 64 and, thus, allows relative movement between the door 14 and the arm 64 when the door 14 is moved between the closed state and the open state.

The arm 68 may include a first housing 76, a second housing 78, and a locking mechanism 80. The first housing 76 may rotatably support the rollers 64 at a first end 82 and may include an opening 84 at a second end 86. The first housing 76 may additionally include a notch 88 located between the first end 82 and the second end 86 and one or more strengthening ribs 90. The strengthening ribs 90 may be formed along a longitudinal axis of the first housing 76 and may provide the first housing 76 with a desired stiffness.

The notch 88 may be formed into a side wall 92 and may be formed at an angle relative to the longitudinal axis of the first housing 76. Namely, the notch 88 may be formed into the side wall 92 of the first housing 76 such that a distal end 94 (FIG. 10) of the notch 88 is disposed closer to the second end 86 of the first housing than an entrance 96 of the notch 88. In short, the entrance 96 of the notch 88 may be disposed closer to the first end 82 while the distal end 94 of the notch 88 may be disposed closer to the second end 82, thereby positioning the notch 88 at an angle relative to the longitudinal axis of the first housing 76.

The first housing 76 may include a substantially clamshell design that includes a first portion 98 and a second portion 100. The first portion 98 may receive a portion of the second portion 100 therein when the first portion 98 is attached to the second portion 100. The first portion 98 may be attached to the second portion 100 via a suitable process as, for example, welding and may be fixed for movement with the second portion 100. While the first housing 76 is described as shown as including a first portion 98 and a second portion 100, the first housing 76 could alternatively include a unitary construction that is formed from a single piece of material. Regardless of the specific construction of the first housing 76, the first housing 76 may define a channel 102 that slidably receives the second housing 78 therein.

The second housing 78 may include a first end 104, a second end 106, and a notch 108 disposed between the first end 104 and the second end 106. The first end 104 may be slidably received within the channel 102 of the first housing 76 at the opening 84 such that the second end 106 of the second housing 78 extends from the second end 86 of the first housing 76. The second end 106 may include a pair of attachment apertures 110 that pivotably receive the pivot 74 to attach the second end 106 of the second housing 78 to the mounting bracket 66.

The notch 108 may be formed in a side wall 112 of the second housing 78 and may include a first end 114 that defines an entrance of the notch 108 and a distal end 116. As with the notch 88 of the first housing 76, the notch 108 may be formed in the second housing 78 at an angle relative to a longitudinal axis of the second housing 78. Namely, the distal end 116 may extend into the second housing 78 such that the distal end 116 of the notch 108 is disposed closer to the second 106 than the first end 114. Accordingly, the first end 114 may be positioned such that the first end 114 is disposed closer to the first end 104 of the second housing 78 than the distal end 116.

The notch 108 may be formed at substantially the same angle relative to a longitudinal axis of the second housing 78 as the angle of the notch 88 is formed relative to the longitudinal axis of the first housing 76. Because the notches 88, 108 may be formed at the same angle relative to the longitudinal axis of the first and second housings 76, 78, respectively, the notches 88, 108 may be formed at the same angle relative to a longitudinal axis of the arm 68 and, thus, when the second housing 78 is positioned relative to the first housing 76 such that the notches 88, 108 are aligned, a channel 118 (FIG. 10) of the second housing 78 is exposed via the first notch 88 and a second notch 108.

The locking mechanism 80 may include a locking wheel 120 and an actuation mechanism 122 that positions the locking wheel 120 relative to the arm 68. The locking wheel 120 may include a central aperture 124 that rotatably supports the locking wheel 120 relative to the arm 68. Specifically, the central aperture 124 may receive a fastener (not shown) that is attached to the first housing 76 of the arm 68. The fastener may rotatably support the locking wheel 120 relative to the first housing 76 to permit the locking wheel 120 to rotate relative to the arm 68. The locking wheel 120 may additionally include a locking post 126 having an engagement surface 128 and a cable seat 130. The engagement surface 128 may engage the first housing 76 and the second housing 78 within the respective notches 88, 108 to restrict relative translation between the first housing 76 and the second housing 78 when the locking mechanism 80 is in a locked state and may be disengaged from the notches 88, 108 when the locking mechanism 80 is in an unlocked state to permit relative translation between the first housing 76 and the second housing 78, as will be described in greater detail below. The actuation mechanism 122 may include a link 132 having a first end 134 rotatably attached to the cable seat 130 of the locking post 126 and a second end 136 rotatably attached to a cable seat 138 of the pivot 74.

With particular reference to FIGS. 2-9, operation of the sliding-door system 12 will be described in detail. When the door 14 is in the closed state (FIGS. 1 and 2) the rollers 38 associated with the upper track 20 and the rollers 52 associated with the lower track 12 are disposed within the curved portions 30, 46 of the upper track 20 and the lower track 22, respectively. Further, the rollers 64 associated with the middle track 24 are likewise disposed within the curved portion 58 of the middle track 24. In this position, the upper roller assembly 36 and the lower roller assembly 50 exert a force on the middle roller assembly 62 such that the second housing 78 of the arm 68 is disposed almost entirely within the channel of the first housing 76.

The second housing 78 is urged into the first housing 76 due to the application of a force exerted on the second housing 78 by the upper roller assembly 36 and the lower roller assembly 50. Specifically, because the curved portions 30, 46 of the upper track 20 and the lower track 22, respectively, have a larger radius of curvature ($r_2$) than the radius of curvature ($r_1$) of the middle track 24 (FIG. 2), when the door 14 is in the closed state, the upper roller assembly 36 and the lower roller assembly 50 apply a force on the middle roller assembly 62 via the door 14, the mounting bracket 66, and the pivot 74. The force may be applied in a direction (F) shown in FIG. 2, which causes the second housing 78 to be almost entirely received within the channel 102 of the first housing 76.

Figure 2:
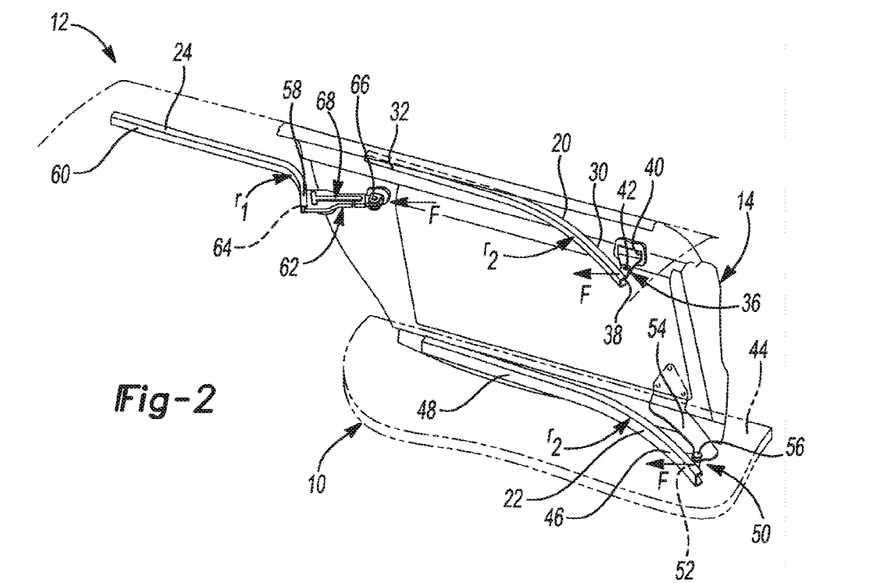
FIG. 2 is a partial perspective view of the vehicle of FIG. 1 showing the sliding-door assembly in a closed state.
Figure 7:
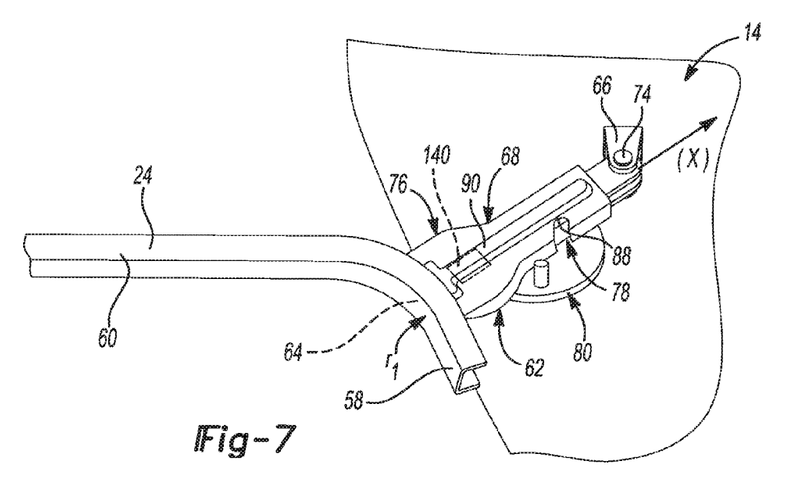
FIG. 7 is a partial perspective view of the sliding-door assembly of FIG. 1 showing a door of the sliding-door assembly in a partially open state and a middle rail lever arm in a partially extended state.
Figure 8:
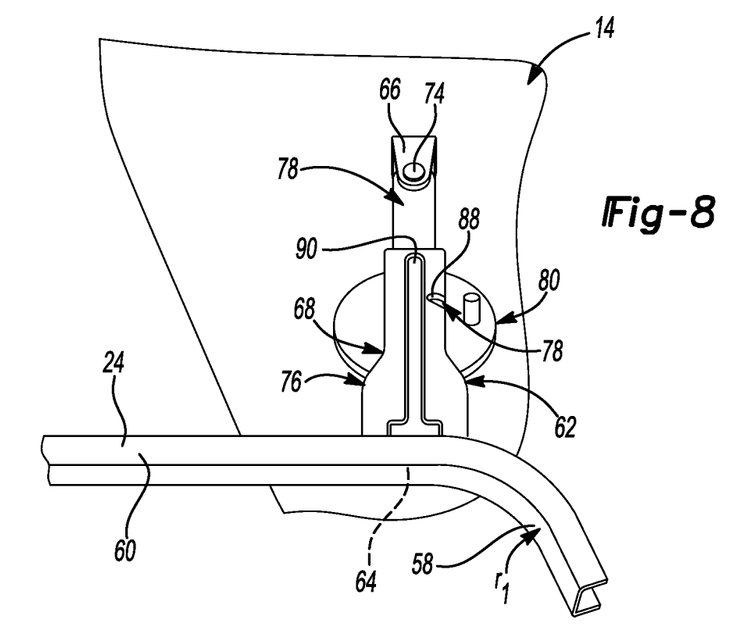
FIG. 8 is a partial perspective view of the sliding-door assembly of FIG. 1 showing a door of the sliding-door assembly in a partially open state and a middle rail lever arm in a partially extended state.
Figure 9:
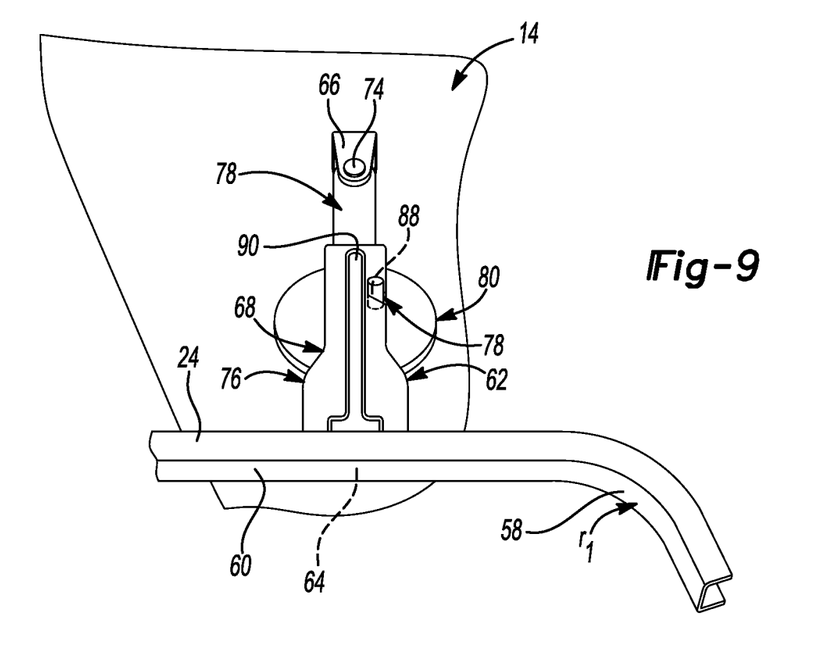
FIG. 9 is a partial perspective view of the sliding-door assembly of FIG. 1 showing a door of the sliding-door assembly in an open state and a middle rail lever arm in an extended state.

The arm 68 may include a biasing member 140 such as a coil spring that biases the second housing 78 in the (X) direction, as shown in FIGS. 6 and 7. Therefore, when the door 14 is in the closed state, the force exerted on the second housing 78 in the direction (F) overcomes the biasing force exerted on the second housing 78 by the biasing member, thereby causing the second housing 78 to remain within the channel 102 of the first housing 76 (FIGS. 2 and 6).

Figure 5:
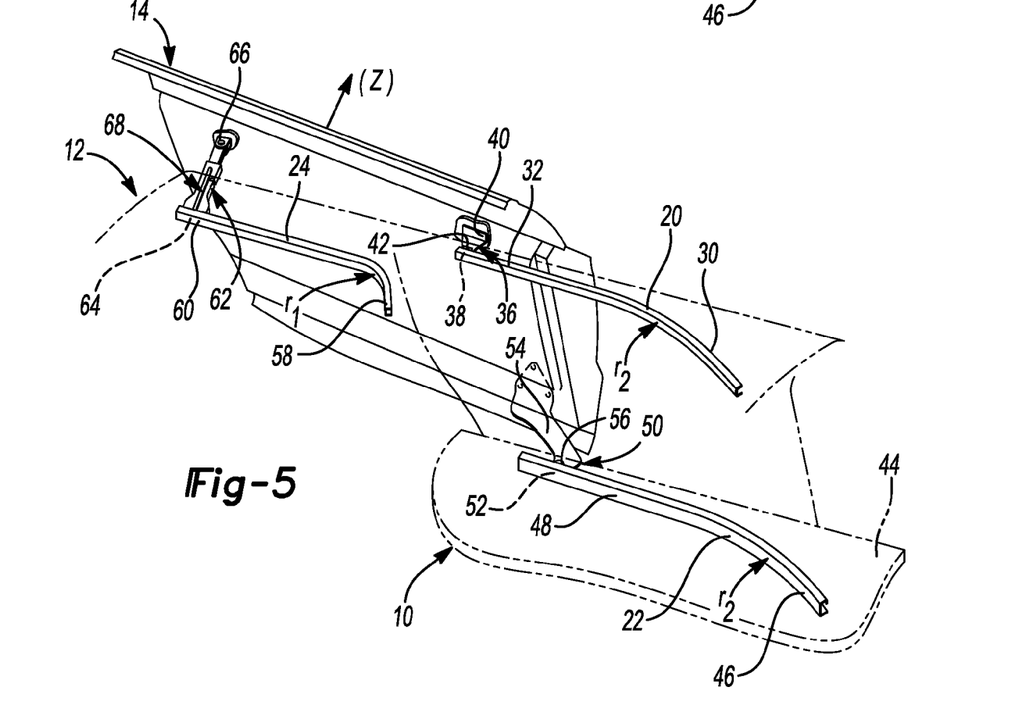
FIG. 5 is a partial perspective view of the vehicle of FIG. 1 showing the sliding-door assembly in an open state.

The second housing 78 remains disposed within the channel 102 of the first housing 76 until the force exerted on the arm 68 is released. The force may be released by moving the door 14 from the closed state (FIGS. 1 and 2) to the partially open states (FIGS. 3 and 4) or into the fully open states (FIG. 5). When the door 14 is initially moved to the partially open states, as shown in FIGS. 3 and 4, the force exerted on the arm 68 by the upper roller assembly 36 and the roller assembly 50 in the direction (F) is reduced, when the middle roller assembly 62 moves from the curved portion 58 toward the straight portion 60. Specifically, the middle roller assembly 62 reaches the transition between the curved portion 58 and the straight portion 60 of the middle track 24 sooner than the upper roller assembly 36 and the lower roller assembly 50 reach the respective junctions between the curved portions 30, 46 and the straight portions 32, 48 of the upper track 20 and the lower track 22 due to the different radii of curvature between the upper track 20 and the lower track 22 ($r_2$) and the middle track 24 ($r_1$).

The difference in the radii of curvature between ($r_1$, $r_2$) amongst the tracks 20, 22, 24 allows the biasing element disposed within the arm 68 to urge the second housing 78 away from the first end 82 of the first housing 76 and in the (X) direction. In so doing, the second housing 78 moves relative to and within the channel 102 of the first housing 76 and essentially telescopes and extends from the second end 86 of the first housing 76 when the door 14 is moved into a partially open state or into the fully open state.

As the door 14 is continually moved from the closed state to the open state and relative to the rear-body panel 26, the middle roller assembly 62 encounters the straight portion 60 of the middle track 24 which allows the biasing member to fully extend the second housing 78 from the second end 86 of the first housing 76. In so doing, the arm 68 exerts a force (Z; FIG. 5) on the door 14 such that the door 14 is moved away from the rear-body panel 26 when the door 14 is moved into the open state.

Increasing the overall length or effective length of the arm 68 by allowing the second housing 78 to telescope within and relative to the first housing 76 such that the second housing 78 extends from the first housing 76 when the door 14 is moved from the closed state to the open state allows the rear-body panel 26 to include a high radius of curvature, as the door 14 is permitted to pass by the rear-body panel 26 due to the extension of the arm 68. In short, extending the second housing 78 from the first housing 76 when the door 14 is positioned proximate to the rear-body panel 26 moves the door 14 away from the rear-body panel 26, which allows the rear-body panel 26 to include a larger radius of curvature and, therefore, a more rounded design.

Allowing the door 14 to move away from the rear-body panel 26 may be permitted by the lower roller assembly 50, as the bracket 54 is permitted to pivot relative to the roller 52 via the pivot 56. Specifically, when the middle roller assembly 62 exerts a force on the door 14 due to the second housing 78 extending from the first housing 76, the door 14 is permitted to move away from the lower sill 44, as the bracket 54 is permitted to pivot about the pivot 56. Further, the lower track 22 may be shaped to accommodate movement of the door 14 away from the rear-body panel 26.

When the door 14 is moved to the open state (FIGS. 5 and 9), the locking mechanism 80 may be positioned in the locked state such that the locking post 126 is received within the notches 88, 108 of the first housing 76 and second housing 78, respectively. Specifically, the locking wheel 120 may be rotated relative to the arm 68 by the actuation mechanism 122, which is rotatably attached at the first end 134 to cable seat 130 of the locking post 126 and is rotatably attached at the second end 136 to the cable seat 138 of the pivot 74. Accordingly, when the middle roller assembly 62 moves from the curved portion 58 to the straight portion 60 of the middle track 24 and the second housing 78 moves away from the first housing 76, the mounting bracket 68 and, thus, the pivot 74, likewise moves away from the first housing 76. Such movement applies a force on the link 132 of the actuation mechanism 122, thereby placing the link 132 under tension.

Placing the link 132 under tension likewise applies a force on the first end 134 and the second end 136 of the link 132. The force exerted on the link 132 causes the locking wheel 120 to rotate about the central aperture 124 due to the force exerted on the cable seat 130 of the locking post 126 by the first end 134 of the link 132. The position of the locking post 126 relative to locking wheel 120 and the distance of the locking post 126 from the central aperture 124 along with the length of the link 132 determine when the locking post 126 encounters the respective notches 88, 108 of the first housing 76 and the second housing 78. Accordingly, the locking post 126 may encounter the notches 88, 108 when the notches 88, 108 are aligned to allow the locking post 126 to be received within the notches 88, 108. Specifically, when the second housing 78 is sufficiently translated relative to the first housing 76 in the (X) direction (FIG. 6), such that the notch 88 is aligned with the notch 108, the locking mechanism 80 may be designed such that the locking post 126 is rotated into engagement with the notches 88, 108 and is received generally within the channel 102 of the first housing 76 and within the channel 118 of the second housing 78. Properly timing the rotation of the locking wheel 120 such that the locking post 126 is received within the notches 88, 108 of the first housing 76 and the second housing 78 may be controlled by the relative position of the locking post 126 on the locking wheel 120 as well as by adjusting the length of the link 132.

When the locking post 126 is received within the notches 88, 108, movement of the second housing 78 into the channel 108 of the first housing 76 is restricted. As such, the arm 68 essentially prevents the door 14 from being moved in a direction toward the rear-body panel 26. Preventing movement of the door 14 in a direction toward the rear-body panel 26 when the door 14 is in the open state prevents the door 14 from inadvertently being moved into engagement with the rear-body panel 26 and, as a result, prevents damage from occurring to either of the door 14 or the rear-body panel 26.

The door 14 may be returned to the closed state by applying a force on the door to move the upper roller assembly 36, the lower roller assembly 50, and the middle roller assembly 62 relative to the upper track 20, the lower track 22, and the middle track 24, respectively. As the door 14 is moved along the respective tracks 20, 22, 24, the locking mechanism 80 is moved from the locked state to the unlocked state, as the link 132 exerts a force on the locking wheel 120, thereby causing the locking post 126 to disengage the notches 88, 108. At this point, the second housing 76 is free to translate relative to and within the channel 102 of the first housing 76, as the door 14 is returned to the closed state.

When the door 14 is sufficiently moved relative to the rear-body panel 26 such that the respective roller assemblies 36, 50, 62 engage the curved portions 30, 46, 58 of the tracks 20, 22, 24, the upper roller assembly 36 and the lower roller assembly 50 once again apply a force on the middle roller assembly 62 in the direction (F), thereby causing the second housing 78 of the arm 68 to exert a force against the biasing element. Exerting a force on the biasing element causes the second housing 78 to move into the channel 102 of the first housing 76 and toward the first end 82. When the door 14 is returned to the closed state, the second housing 78 may once again be almost entirely disposed within the channel 102 of the first housing 76 due to the forces exerted on the middle roller assembly 62 in the direction (F) by the upper roller assembly 36 and the lower roller assembly 50.

What is claimed is:

1. A sliding-door assembly for a vehicle, the sliding-door assembly comprising:
    a door movable relative to the vehicle between a closed state and an open state; and
    a support arm slidably supporting said door relative to the vehicle and including a first housing and a second housing, said first housing slidably attached to the vehicle, said second housing including an end pivotably attached to said door, wherein the first housing and the second housing operatively engage with each other so that the second housing is linearly movable relative to the first housing between a retracted state and an extended state, wherein a length of said support arm when said second housing is in said retracted state is less than the length of said support arm when said second housing is in said extended state,
    wherein said second housing is received within said first housing,
    wherein said first housing slidably engages a track in the vehicle such that said support arm moves relative to the vehicle along a path having an arcuate portion and a linear portion as the first housing slides relative to the vehicle as the door moves between the closed state and the open state, and
    wherein said first and second housings are non-rotatably fixed relative to each other.

2. The sliding-door assembly of claim 1, wherein said second housing is telescopically received in said first housing.

3. The sliding-door assembly of claim 1, wherein said second housing is in said retracted state when said door is in said closed state preventing access through an opening of the vehicle and is in said extended state when said door is in said open state permitting access through the opening.

4. The sliding-door assembly of claim 1, wherein said second housing is biased toward said extended state.

5. The sliding-door assembly of claim 1, wherein said second housing translates away from said first housing when moving from said retracted state to said extended state along an axis substantially parallel to a longitudinal axis of said first housing.

6. A sliding-door assembly for a vehicle, the sliding-door assembly comprising:
    a door movable relative to the vehicle between a closed state and an open state;
    a support arm slidably supporting said door relative to the vehicle and including a first housing and a second housing, said first housing slidably attached to the vehicle, said second housing including a first end operatively attached to said first housing and a second end operatively attached to said door, said second housing linearly movable relative to the first housing between a retracted state and an extended state, wherein a length of said support arm when said second housing is in said retracted state is less than the length of the support arm when the second housing is in the extended state, and
    a locking mechanism operable to selectively prevent movement of said second housing toward said first housing when said second housing is in said extended state,
    wherein said second housing is received within said first housing,
    wherein a first end of said first housing slidably engages a track in the vehicle such that said support arm moves relative to the vehicle along a path having an arcuate portion and a linear portion as the first housing slides relative to the vehicle as the door moves between the closed state and the open state, and a second end of said first housing is slidably attached to said second housing, and
    wherein said second housing is slidably attached to said first housing at said first end of said second housing and is pivotably attached to said door at said second end of said second housing.

* * * * *